(12) United States Patent
Doi et al.

(10) Patent No.: US 6,223,867 B1
(45) Date of Patent: May 1, 2001

(54) DISK BRAKE

(75) Inventors: Kazuhiro Doi; Tadashi Tamasho, both of Kanagawa-ken; Hideaki Ishii, Yamanashi-ken; Takahiro Tokunaga, Yamanashi-ken; Joichi Yokoo, Yamanashi-ken; Shinji Suzuki, Yamanashi-ken, all of (JP)

(73) Assignees: Tokico LTD; Nissan Motor Co., Ltd., both of Kanagawa-ken (JP)

( * ) Notice: Subject to any disclaimer, the term of this patent is extended or adjusted under 35 U.S.C. 154(b) by 0 days.

(21) Appl. No.: 09/168,275

(22) Filed: Oct. 7, 1998

(30) Foreign Application Priority Data

Oct. 8, 1997 (JP) .................................................. 9-291651

(51) Int. Cl.$^7$ ...................................................... F16D 65/14
(52) U.S. Cl. ...................... 188/73.45; 188/73.44; 188/73.41; 188/73.34; 188/72.4
(58) Field of Search .............................. 188/72.4, 73.34, 188/73.39, 73.41, 73.43, 73.42, 73.44, 73.46, 73.45

(56) References Cited

U.S. PATENT DOCUMENTS

| | | | |
|---|---|---|---|
| 5,167,303 | * 12/1992 | Kabayashi et al. | 188/71.1 |
| 5,259,484 | * 11/1993 | Idesawa et al. | 188/73.45 |
| 5,947,233 | * 9/1999 | Kabayashi et al. | 188/72.3 |

* cited by examiner

Primary Examiner—Christopher P. Schwartz
Assistant Examiner—Devon Kramer
(74) Attorney, Agent, or Firm—Wenderoth, Lind & Ponack, L.L.P.

(57) ABSTRACT

A disk pass portion for receiving a part of a disk is provided between a cylinder portion and an outer claw portion of a caliper body at the inner peripheral side of a bridge portion of the caliper body. A pair of mounting portions extend arcuately from both sides of the bridge portion to lie outside the disk pass portion with respect to the radial direction of the disk. A pair of sliding pins are secured to the distal ends of the mounting portions through pin bolts and slidably fitted in pin-fitting holes provided in a mounting member supporting the caliper. When the brake is activated, friction pads are pressed against the disk by the caliper. At this time, deformation of the caliper by reaction forces from the disk is small around the area where proximal portions of the mounting portions are connected to the caliper body.

20 Claims, 8 Drawing Sheets

DISK BRAKE

BACKGROUND OF THE INVENTION

The present invention relates to a disk brake suitably used to apply braking force to a vehicle, for example.

A general disk brake has a mounting member secured to a non-rotating part of a vehicle. The mounting member supports a caliper such that the caliper is movable in the axial direction of a disk. The caliper has pin-mounting portions projecting from two opposite sides of a caliper body. Each pin-mounting portion supports a sliding pin. The sliding pin is fitted in a guide hole provided in the mounting member.

During a braking operation, bending moment acts on the caliper. Consequently, the caliper is deformed. The deformation of the caliper causes a change in the angle of each sliding pin relative to the associated guide hole. Accordingly, the conventional disk brake structure suffers from the problem that smooth sliding motion of the sliding pins cannot be maintained.

SUMMARY OF THE INVENTION

To solve the above-described problem, the present invention is applied to a disk brake having a caliper and a mounting member secured to a non-rotating part of a vehicle. To allow the caliper to be slidably supported by the mounting member, sliding pins, which are provided in one of the mounting member and the caliper, are fitted in respective guide holes provided in the other of the two. A first friction member, which is provided at one side of a disk, is pressed against the one side of the disk by an operation of a piston provided in the caliper. A second friction member, which is provided at the other side of the disk, is pressed against the other side of the disk by sliding motion of the caliper relative to the mounting member caused by the pressing of the first friction member against the disk.

An arrangement adopted by the present invention is characterized in that the caliper has an integral structure that includes a cylinder portion disposed at one side of a disk and provided with a cylinder bore for receiving a piston that presses a friction member provided at the one side of the disk. In addition, a claw portion is disposed at the other side of the disk to press a friction member provided at the other side of the disk. A bridge portion extends over the outer periphery of the disk in the axial direction of the disk to connect the cylinder portion and the claw portion. The cylinder portion, the bridge portion and the claw portion constitute in combination a caliper body. A pair of mounting portions extend from the caliper body toward the entrance and exit sides, respectively, with respect to the rotational direction of the disk. The distal ends of the mounting portions are attached to the mounting member through the sliding pins, respectively. Each mounting portion is disposed such that at least the sectional center thereof lies outside the outer periphery of the disk as viewed in the axial direction of the disk.

Thus, each mounting portion of the caliper can be provided to extend from a portion of the caliper body that suffers minimal deformation during a braking operation. Therefore, even when the caliper is deformed by reaction force from the disk when the brake is activated, deformation of each mounting portion can be minimized. Accordingly, it is possible to prevent the sliding pins from tilting when sliding in the guide holes provided in one of the mounting member and the caliper, which would otherwise be caused by the deformation.

According to one embodiment of the present invention, each mounting portion is disposed such that the proximal end thereof, which is closer to the caliper body, is closer to the disk than the distal end thereof, which is attached to the mounting member through the sliding pin, with respect to the axial direction of the disk.

The above-described arrangement also enables each mounting portion of the caliper to extend from a portion of the caliper body that suffers minimal deformation during a braking operation. Therefore, even when the caliper is deformed by reaction force from the disk when the brake is activated, deformation of each mounting portion can be minimized. Moreover, by disposing the proximal end of each mounting portion closer to the disk than the distal end thereof, the caliper body can be supported by the mounting portions at a position close to the center of gravity thereof with respect to the axial direction of the disk. Accordingly, the caliper can be stably supported relative to the mounting member by the mounting portions when the brake is not activated at least until either of the friction pads has worn away beyond an effective wear margin.

According to another embodiment of the present invention, the caliper has its center of gravity placed within the range of the fitting length of the sliding pins relative to the guide holes in the axial direction of the disk at least when the brake is not activated.

Thus, the fitting position of each sliding pin relative to the associated guide hole can be predetermined so that the center of gravity of the caliper is placed within the range of the fitting length of the sliding pin in the guide hole when the brake is not activated. Accordingly, the caliper can be kept supported in a stable balanced condition by the mounting member.

DETAILED DESCRIPTION OF THE INVENTION

Prior to the description of embodiments of the present invention, a general disk brake will be described with reference to FIGS. 7 to 10, followed by a description of the distinction between the conventional disk brake and the present invention, for the purpose of facilitating the understanding of the present invention.

Figure 7:
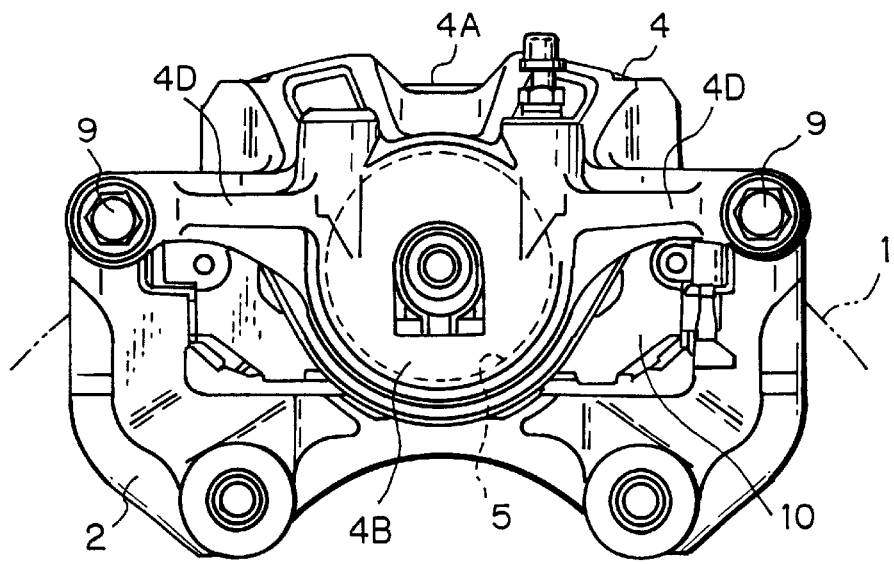
FIG. 7 is a front view showing a disk brake according to a prior art.
Figure 8:
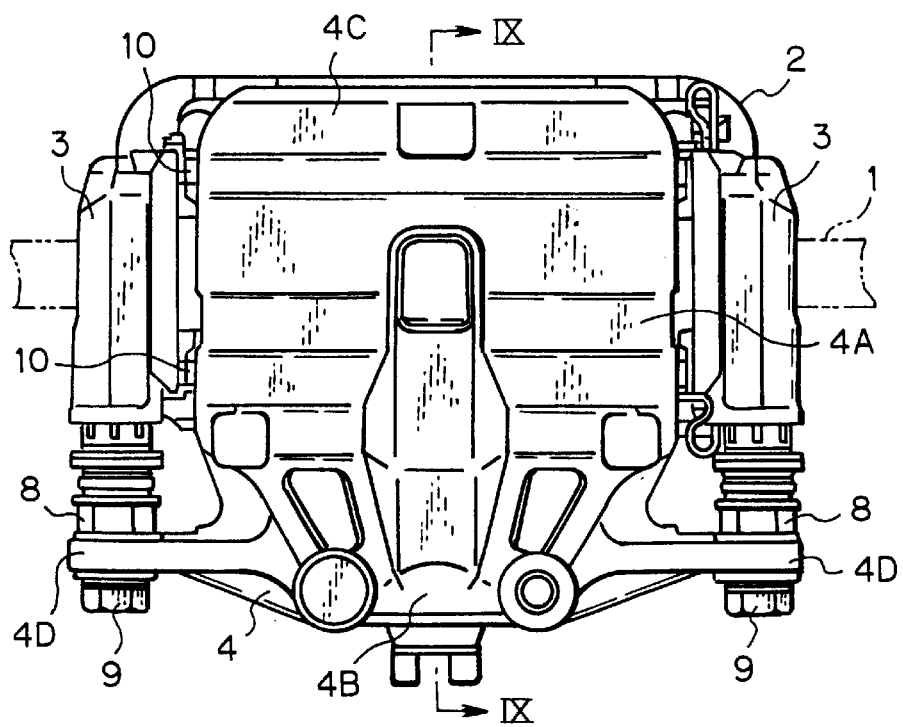
FIG. 8 is a plan view of the disk brake shown in FIG. 7.
Figure 9:
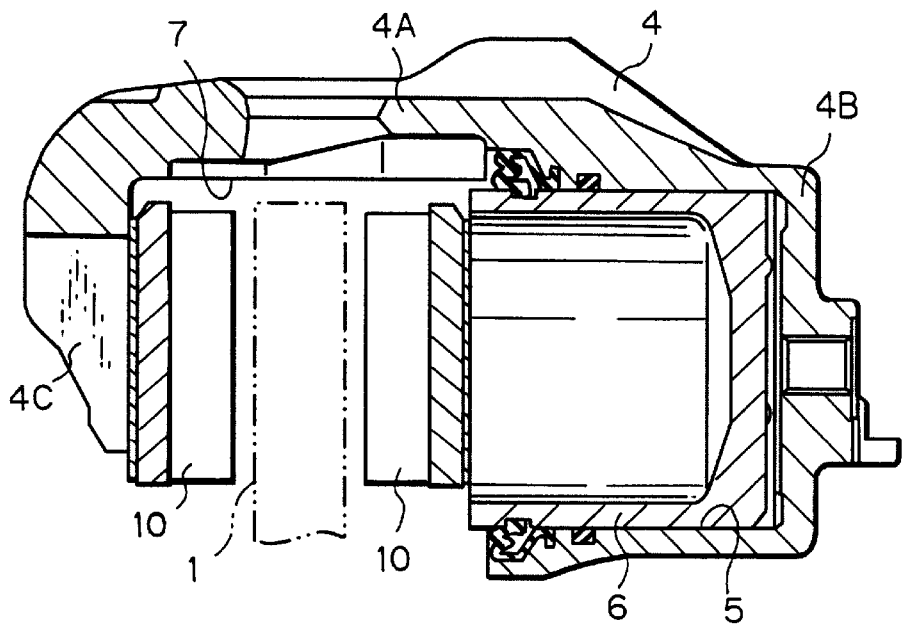
FIG. 9 is an inlarged sectional view as seen from the direction arrow IX—IX in FIG. 8.
Figure 10:
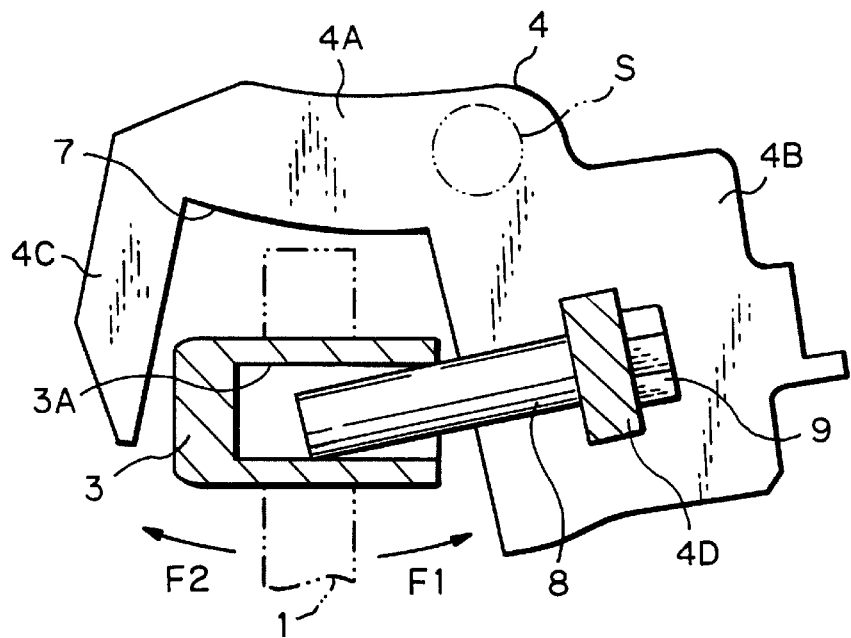
FIG. 10 is a diagram illustrating the way in which a caliper of the disk brake shown in FIG. 9 is deformed during a braking operation.

Referring to FIGS. 7 to 10, a disk 1 rotates together with a wheel of a vehicle. A mounting member 2 is integrally secured to a non-rotating part of the vehicle at a position on the inner side of the disk 1. As shown in FIG. 8, the mounting member 2 has a pair of arm portions 3 spaced apart from each other in the circumferential direction of the disk 1. The arm portions 3 extend over the outer periphery of the disk 1 in the axial direction of the disk 1. As shown in FIG. 10, each arm portion 3 has a pin-fitting hole 3A for fitting a sliding pin 8 (described later). The pin-fitting hole 3A is axially formed in each arm portion 3 as a guide hole, one end of which is closed.

A caliper 4 is slidably supported by the mounting member 2 through the sliding pins 8. As shown in FIG. 9, the caliper 4 has a bridge portion 4A extending over the outer periphery of the disk 1 in the axial direction of the disk 1. The caliper 4 further has a cylinder portion 4B as an inner leg portion. The cylinder portion 4B is integrally formed with the bridge portion 4A at one side of the bridge portion 4A and disposed at a position on the inner side of the disk 1. A claw portion 4C is integrally formed with the bridge portion 4A at the other side of the bridge portion 4A. The claw portion 4C is disposed at a position on the outer side of the disk 1 as an outer leg portion. The cylinder portion 4B, the bridge portion 4A and the claw portion 4C constitute a caliper body. A pair of mounting portions 4D (see FIG. 10) are provided on the caliper body to mount the sliding pins 8.

The cylinder portion 4B is provided with a cylinder bore 5. A piston 6 is slidably fitted in the cylinder bore 5. A disk pass portion 7 is formed on the inner peripheral side of the bridge portion 4A between the cylinder portion 4B and the claw portion 4C to provide a space for passing the disk 1. As shown in FIGS. 7 and 8, the mounting portions 4D project straight from the left and right sides, respectively, of the cylinder portion 4B of the caliper body on both sides of the cylinder bore 5. The mounting portions 4D extend approximately parallel to the surface of the disk 1.

The pair of sliding pins 8 are used to enable the caliper 4 to be slidably supported by the mounting member 2. As shown in FIGS. 8 and 10, the proximal end of each sliding pin 8 is secured to the distal end of the associated mounting portion 4D of the caliper 4 by a pin bolt 9. The distal end portion of each sliding pin 8 is slidably fitted in the pin-fitting hole 3A of the associated arm portion 3.

A pair of friction pads 10 are adapted to be pressed against both sides of the disk 1 by the caliper 4. As shown in FIG. 9, the friction pads 10 are disposed between the cylinder portion 4B and claw portion 4C of the caliper 4, facing each other across the disk 1. The friction pads 10 are supported by the mounting member 2 so as to be slidable in the axial direction of the disk 1.

In the conventional disk brake arranged as stated above, when a braking operation is initiated, a brake fluid pressure is externally supplied into the cylinder bore 5 of the caliper 4, causing the piston 6 to be slidably displaced in the cylinder bore 5. Thus, the friction pad 10 closer to the cylinder portion 4B is pressed toward the disk 1. At this time, reaction force acts on the caliper 4 in such a way that the whole caliper 4 is slidably displaced relative to the mounting member 2 through the sliding pins 8. Consequently, the friction pad 10 closer to the claw portion 4C is pressed against the disk 1 by the claw portion 4C. Thus, the disk 1 is gripped by the friction pads 10 from both sides thereof, and braking force is applied to the disk 1.

In the above-described prior art, when the friction pads 10 are pressed against the two sides of the disk 1 during the braking operation on the basis of the action of the piston 6 in the caliper 4, the cylinder portion 4B and claw portion 4C of the caliper 4 are subjected to a reaction force that urges the cylinder portion 4B and the claw portion 4C to move away from the disk 1. At this time, the cylinder portion 4B and the claw portion 4C tend to be deformed so as to diverge slightly in the directions of the arrows F1 and F2, respectively, as shown in FIG. 10, because the cylinder portion 4B and the claw portion 4C are connected by the bridge portion 4A at the outer peripheral side of the disk 1.

At this time, the sliding pins 8 are displaced to tilt with respect to the axis of the disk 1, together with the cylinder portion 4B and the mounting portions 4D, because the mounting portions 4D project straight from the left and right sides of the cylinder portion 4B on both sides of the cylinder bore 5 as stated above. Therefore, when the caliper 4 slides relative to the mounting member 2 in this state, each sliding pin 8 slides in the pin-fitting hole 3A of the associated arm portion 3 at a slight tilt to the axis of the pin-fitting hole 3A.

Accordingly, each sliding pin 8 is subjected to strong resistance to sliding in the pin-fitting hole 3A because of the deformation of the caliper 4. Thus, the prior art has the disadvantage that the caliper 4 cannot always slide smoothly relative to the mounting member 2 during the braking operation.

When there is strong resistance to sliding in the caliper 4, it is difficult for the caliper 4 to press the friction pads 10 against the disk 1 with constant force by sliding displacement while following slight tilting, oscillation, etc. of the disk 1 during the braking operation. Accordingly, the pressing force applied to each friction pad 10 from the caliper 4 is likely to vary during the braking operation, causing brake judder to occur easily.

In view of the above-described problems of the prior art, the present invention provides a disk brake designed so that it is possible to surely suppress the tilting of each sliding pin with respect to the guide hole during a braking operation and hence possible to smoothly slide the caliper relative to the mounting member through the sliding pins and to allow each friction pad to be stably pressed against the disk by the caliper, thereby surely minimizing brake judder.

Embodiments of the present invention will be described below in detail with reference to FIGS. 1 to 6.

FIGS. 1 to 5 show a first embodiment of the present invention. It should be noted that in this embodiment the same constituent elements as those in the prior art are denoted by the same reference characters, and a description thereof is omitted.

Figure 1:
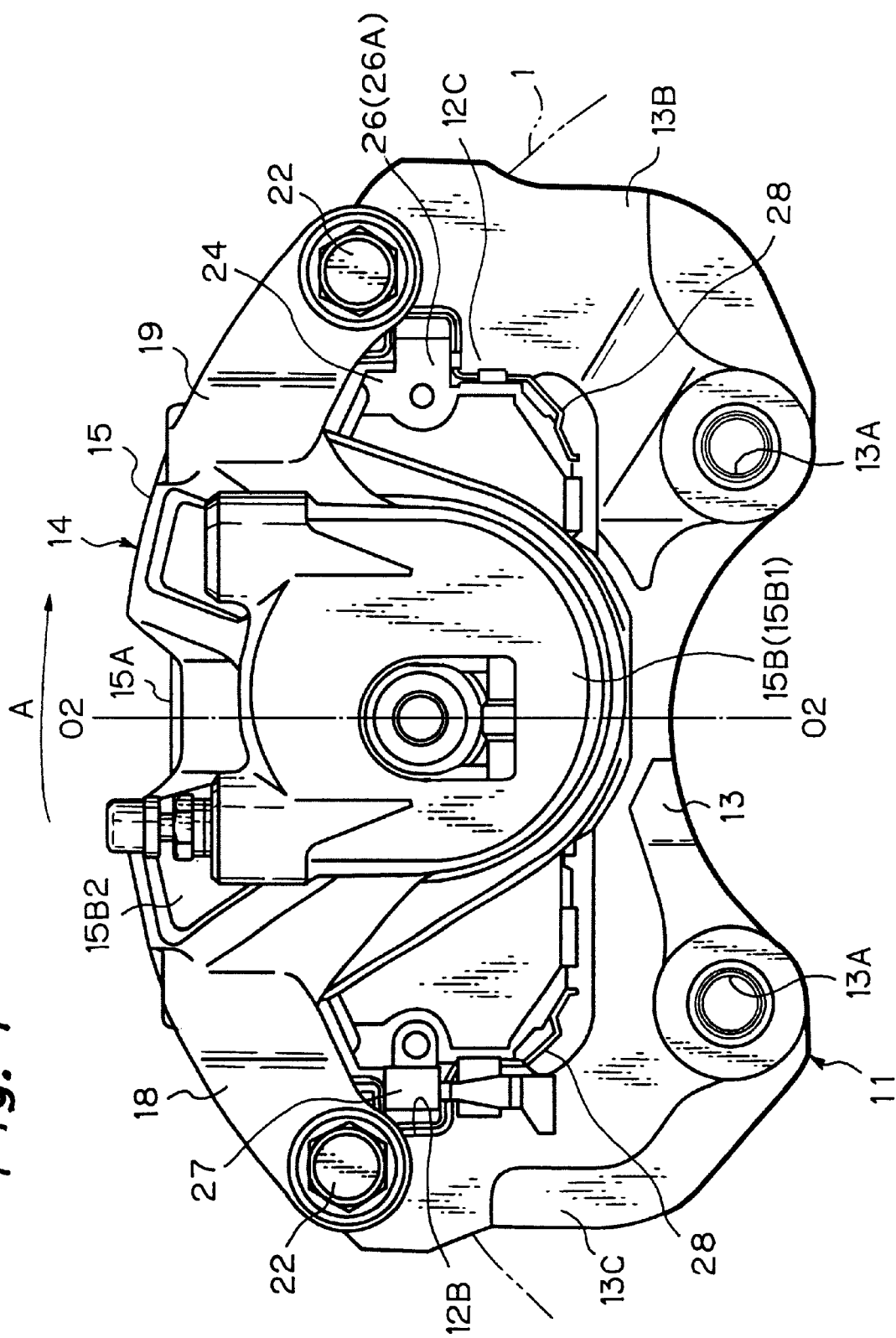
FIG. 1 is a front view showing a disk brake according to a first embodiment of the present invention.
Figure 2:
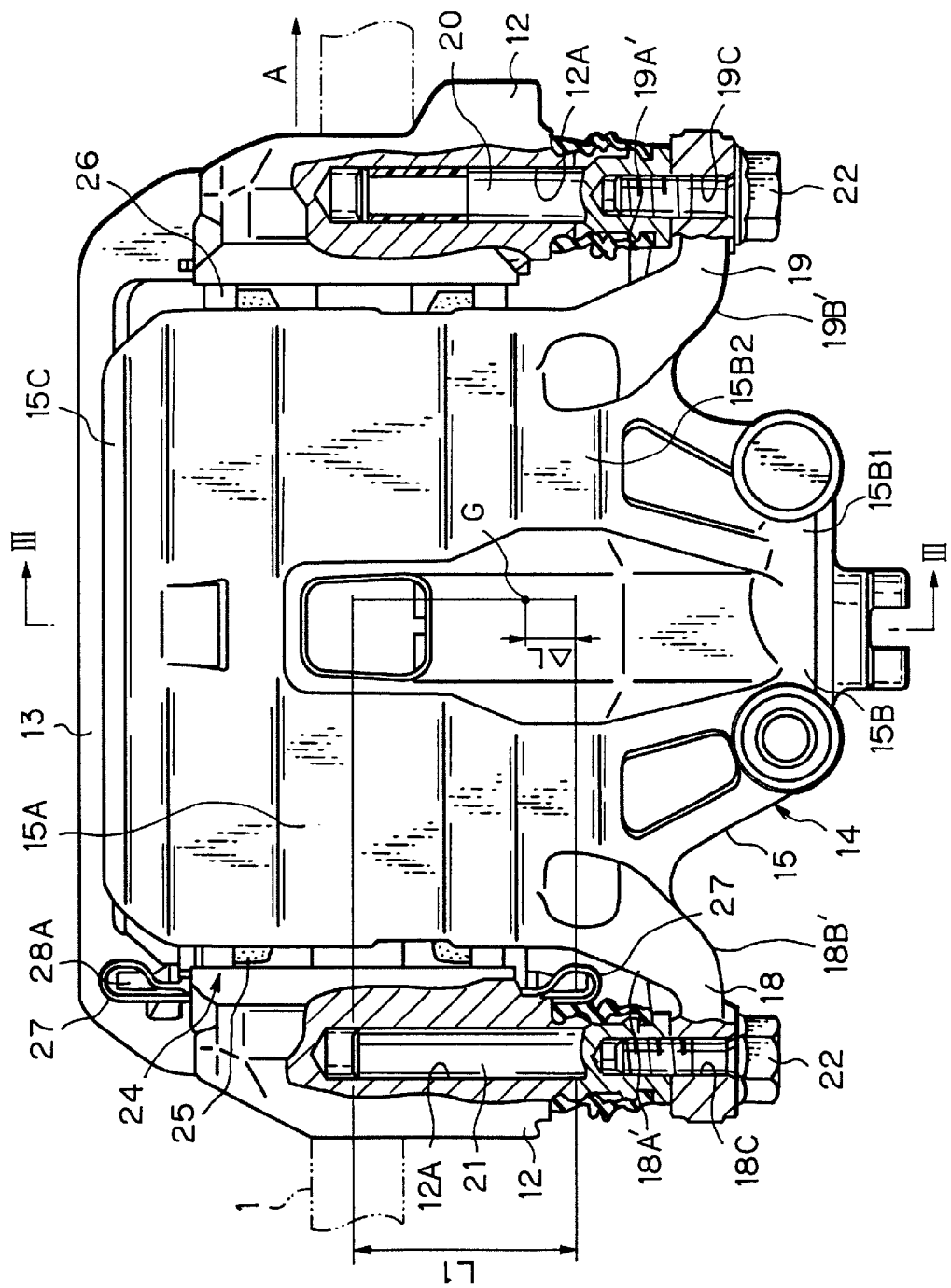
FIG. 2 is a partly-cutaway plan view of the disk brake shown in FIG.

As shown in FIGS. 1 and 2, a mounting member 11 has a pair of arm portions 12 spaced apart from each other in the circumferential direction of a disk 1 and extending over the outer periphery of the disk 1 in the axial direction of the disk 1. The proximal ends of the arm portions 12 are connected by a connecting portion 13. The arm portions 12 and the connecting portion 13 are integrally formed as one unit.

Figure 5:
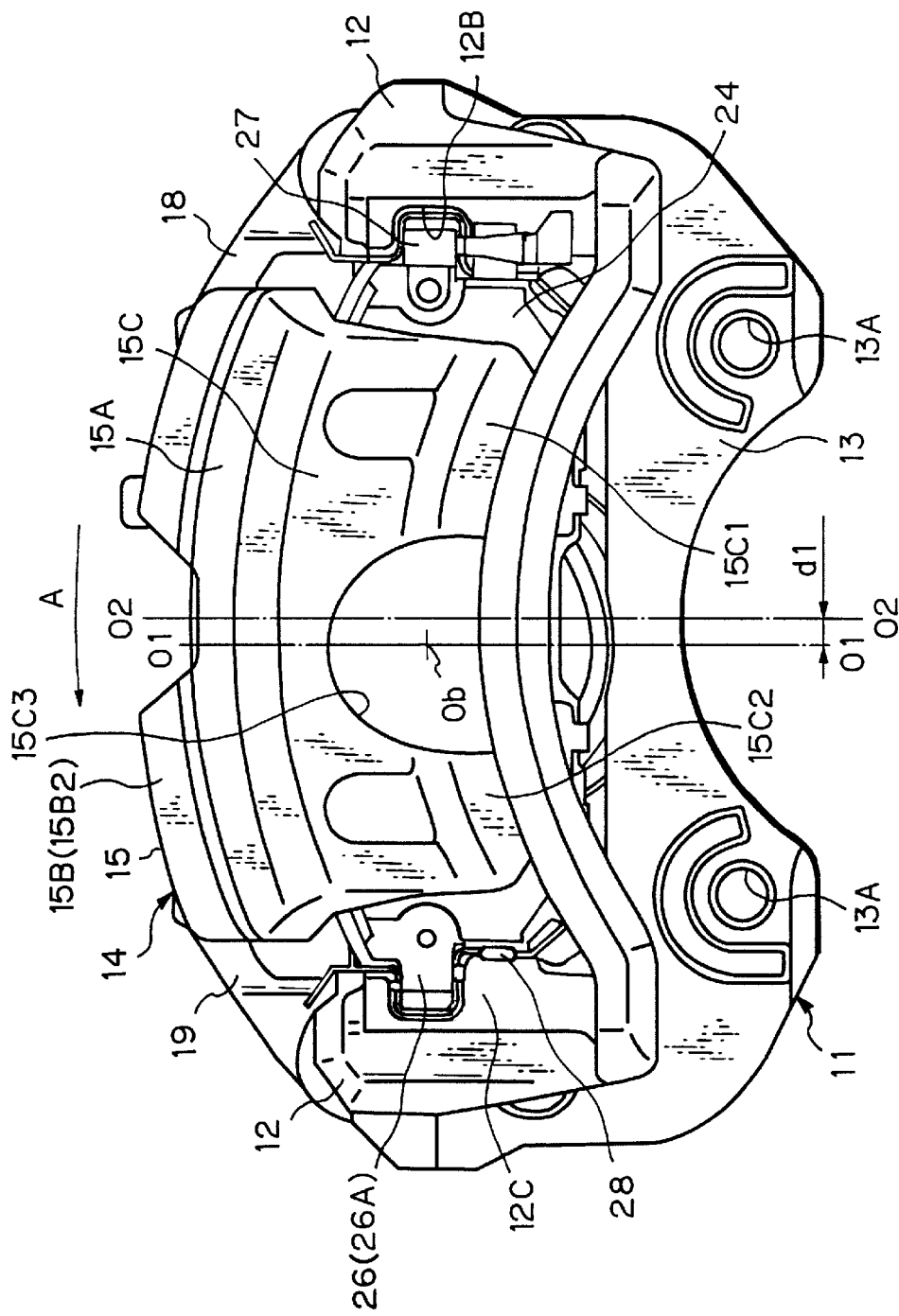
FIG. 5 is a rear view of the disk brake shown in FIG. 1.

As shown in FIG. 2, the arm portions 12 are provided with pin-fitting holes 12A for fitting sliding pins 20 and 21 (described later), respectively. Each pin-fitting hole 12A is formed as a guide hole, one end of which is closed. The pin-fitting holes 12A extend in the axial direction of the disk 1. As shown in FIGS. 1 and 5, each arm portion 12 has pad guide portions 12B with an approximately U-shaped sectional configuration that are formed at its proximal and distal ends, respectively, to guide friction pads 24 (described later) in the axial direction of the disk 1. Each arm portion 12 further has torque-receiving portions 12C formed at its proximal and distal ends, respectively, to bear torque from the disk 1 that is transmitted through the friction pads 24.

As shown in FIG. 1, the connecting portion 13 has a pair of screw holes 13A that are spaced apart from each other in the circumferential direction of the disk 1. The mounting member 11 is integrally secured to a knuckle portion (not shown), for example, as a non-rotating part of the vehicle that is provided on the inner side of the disk 1 through the screw holes 13A. The connecting portion 13 has a thick-walled portion 13B formed at a position on the exit side with respect to the direction of the arrow A shown in FIG. 1, which is the rotational direction of the disk 1 (the direction will be hereinafter referred to as "rotational direction A"). The thick-walled portion 13B has a greater wall thickness than an entrance-side portion 13C in both the circumferential and axial directions of the disk 1. The thick-walled portion 13B enhances the rigidity of the mounting member 11 at this portion.

A caliper 14 is slidably supported by the mounting member 11 through the sliding pins 20 and 21. As shown in FIGS. 1 and 2, the caliper 14 includes a caliper body 15 (described later) and a pair of mounting portions 18 and 19 provided on the caliper body 15.

As shown in FIG. 2, the caliper 14 is arranged such that its center of gravity G lies within a predetermined range in the axial direction of the disk 1 at least when the brake is not activated. The predetermined range is determined to be equal to a fitting length L1 that is defined by the sliding pins 20 and 21 and the pin-fitting holes 12A of the arm portions 12 as described later.

The position of the caliper 14 in a state where the brake is not used gradually shifts toward one side (inner side) as each lining 25 of the friction pad 24 wears away until it reaches a position determined by a wear alarm member 27 (described later). Therefore, the center of gravity G of the caliper 14 is previously offset toward the outer side from the open end side of the pin-fitting holes 12A (i.e. from the inner extremity of the range defined by the fitting length L1) by a distance Δ corresponding to the maximum value of the displacement of the caliper 14. Thus, the center of gravity G of the caliper 14 is kept within the range of the fitting length L1 even when each friction pad 24 has worn away within a normal serviceable range (within an effective wear margin predetermined by the wear alarm member 27).

The caliper body 15 extends over the outer periphery of the disk 1. As shown in FIGS. 2 to 5, the caliper body 15 has a bridge portion 15A extending over the outer periphery of the disk 1 in the axial direction of the disk 1. A cylinder portion 15B is integrally formed with one side of the bridge portion 15A at the one side (inner side) of the disk 1. A claw portion 15C extends radially inward from the other side of the bridge portion 15A at the other side (outer side) of the disk 1. The claw portion 15C has a pair of claws 15C1 and 15C2. The bridge portion 15A has a disk pass surface 15A1 on the inner periphery thereof. The disk pass surface 15A1 is arcuately curved along the outer peripheral surface of the disk 1.

Figure 3:
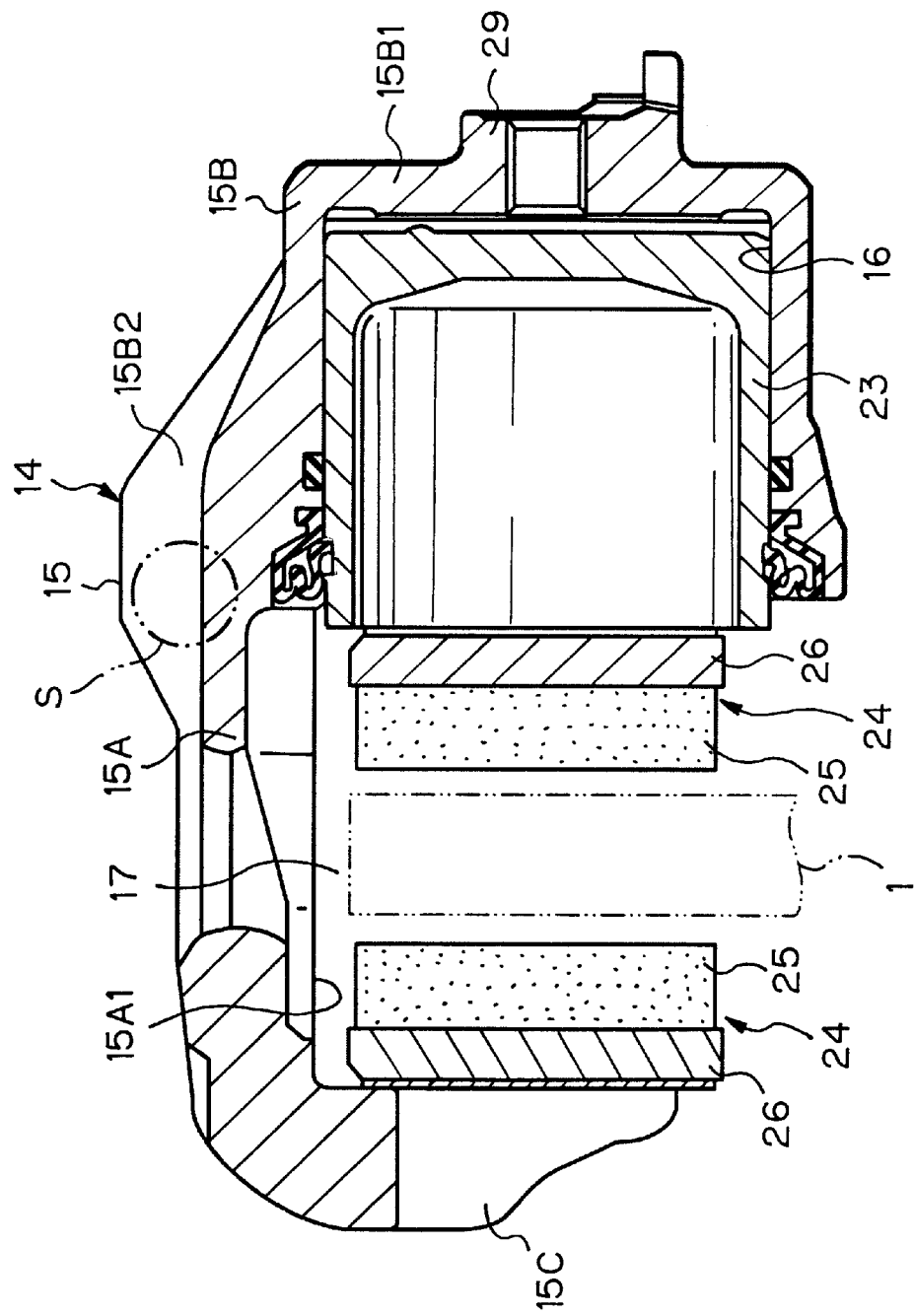
FIG. 3 is an enlarged sectional view as seen from the direct n of the arrow III—III in FIG. 2.
Figure 4:
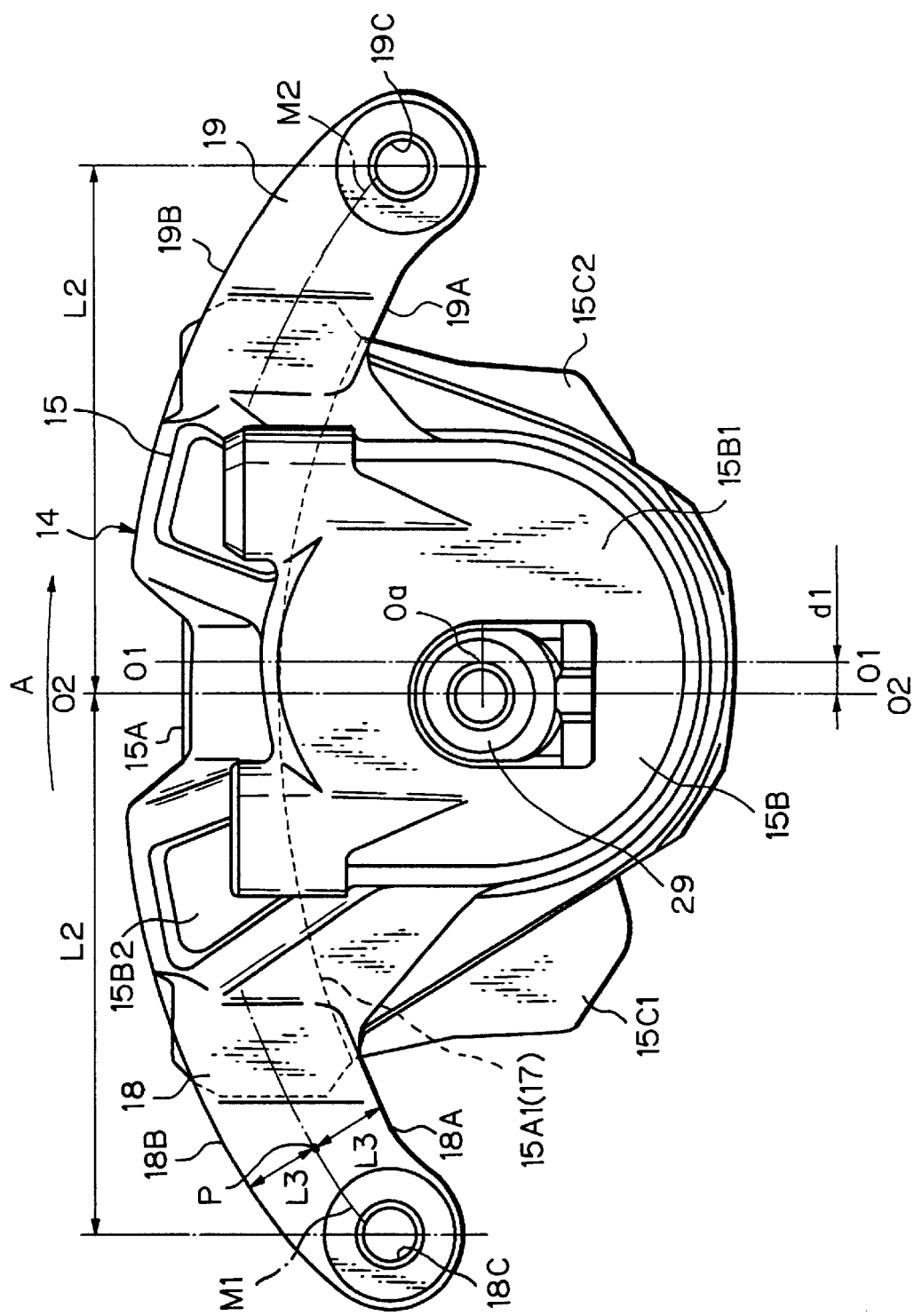
FIG. 4 is an enlarged front view of a caliper of the disk brake shown in FIG. 1.

As shown in FIGS. 3 and 4, the cylinder portion 15B is provided with a circular cylinder bore 16 for fitting a piston 23 (described later). The cylinder bore 16 extends in the axial direction of the disk 1 to face one surface (inner-side surface) of the disk 1. Of the cylinder bore circumferential wall portion 15B1 of the cylinder portion 15B, which forms the cylinder bore 16, the outermost portion in the radial direction of the disk 1 and portions adjacent to it are integrally joined to one side (inner side) of the bridge portion 15A in the axial direction of the disk 1 to constitute a bridge connecting portion 15B2.

A diametrical line O1—O1 of the disk 1 that passes through the center Oa of the cylinder bore 16 is displaced toward the exit side in the rotational direction A by a predetermined distance d1 relative to a center line O2—O2 between pin bolt holes 18C and 19C (described later).

As shown in FIG. 5, the claw portion 15C is arranged such that the claw 15C1, which is located on the entrance side in the rotational direction A, is formed with a greater width in the circumferential direction of the disk 1 than the exit-side claw 15C2 to increase the rigidity of the claw 15C1 entirely in comparison to the claw 15C2.

In addition, an arcuate recess 15C3 is formed between the claws 15C1 and 15C2 such that the center Ob of the recess 15C3 lies on the diametrical line O1—O1 of the disk 1, which passes through the center Oa of the cylinder bore 16, when the caliper 4 is slidably mounted with respect to the mounting member 11.

The bridge portion 15A extends over the outer periphery of the disk 1 between the cylinder portion 15B and the claw portion 15C as stated above. In association with the claw portion 15C arranged as stated above, the bridge portion 15A is arranged as follows. As shown in FIG. 5, the width of an entrance-side portion thereof that extends in the circumferential direction of the disk 1 from the diametrical line O1—O1 of the disk 1, which passes through the center Oa of the cylinder bore 16, to the entrance-side end in the rotational direction A of the disk 1 is greater than the width of an exit-side portion thereof extending from the diametrical line O1—O1 to the exit-side end by a predetermined dimension d1. Thus, the entrance- and exit-side portions of the bridge portion 15A as divided by the diametrical line O1—O1 of the disk 1, which passes through the center Oa of the cylinder bore 16, are formed such that the rigidity of the entrance-side portion is greater than that of the exit-side portion.

As shown in FIG. 3, a disk pass portion 17 is a space for disposing a part of the disk 1 in the caliper 14. As shown in FIGS. 3 and 4, the disk pass portion 17 is formed by an end surface of the cylinder portion 15B of the caliper body 15 where the cylinder bore 16 opens; a surface of the claw portion 15C that faces opposite to the cylinder bore 16; and the disk pass surface 15A1 on the inner periphery of the bridge portion 15A.

A pair of mounting portions 18 and 19 are formed in the shape of arms for slidably mounting the caliper 4 with respect to the mounting member 11. As shown in FIGS. 2 and 4, the mounting portions 18 and 19 are integrally formed with the caliper body 15. More specifically, the proximal ends of the mounting portions 18 and 19 are connected to the caliper body 15 at respective positions spaced apart from each other in the circumferential direction of the disk 1. The distal end portions of the mounting portions 18 and 19 project toward the entrance and exit sides with respect to the rotational direction A of the disk 1.

As shown in FIG. 4, the mounting portions 18 and 19 extend from the caliper body 15 in the circumferential direction of the disk 1 with a predetermined curvature. The mounting portion 18 has an inner peripheral surface 18A and an outer peripheral surface 18B with respect to a plane parallel to the radial direction of the disk 1. Similarly, the mounting portion 19 has an inner peripheral surface 19A and an outer peripheral surface 19B with respect to a plane parallel to the radial direction of the disk 1.

Furthermore, as shown in FIG. 2, the mounting portions 18 and 19 extend from the caliper body 15 in the axial direction of the disk 1 with a predetermined curvature such that the distal ends of the mounting portions 18 and 19 lie more away from the disk 1 than the proximal ends thereof. The mounting portion 18 has an inner peripheral surface 18A' and an outer peripheral surface 18B' with respect to a plane parallel to the axial direction of the disk 1. The mounting portion 19 similarly has an inner peripheral surface 19A' and an outer peripheral surface 19B' with respect to a plane parallel to the axial direction of the disk 1.

The distal end portions of the mounting portions 18 and 19 are provided with pin bolt holes 18C and 19C for securing the sliding pins 21 and 20, respectively. The pin bolt holes 18C and 19C extend in the axial direction of the disk 1.

The caliper body 15 is so designed that when it is slidably mounted with respect to the mounting member 11 by the mounting portions 18 and 19 through the sliding pins 20 and 21, the center line in the widthwise direction of the bridge portion 15A is coincident with the center line O2—O2 between the pin bolt holes 18C and 19C of the mounting member 11. Thus, the diametrical line O1—O1 of the disk 1, which passes through the center Oa of the cylinder bore 16 of the cylinder portion 15B, together with the center Ob of the recess 15C3 between the claws 15C1 and 15C2 of the claw portion 15C, is displaced by the distance d1 relative to the center line O2—O2, which bisects the distance between the pin bolt holes 18C and 19C into dimensions L2.

Furthermore, the mounting portions 18 and 19 are disposed such that at least the sectional centers M1 and M2 lie outside the disk pass portion 17, that is, outside the outer periphery of the disk 1, in the radial direction of the disk. It should be noted that the sectional center M1 of the mounting portion 18 is defined as the locus of the sectional center in terms of the strength of materials with respect to a cross-section perpendicular to the direction of extension of the mounting portion 18. In this embodiment, for example, the locus of a point bisecting the distance between the inner and outer peripheral surfaces 18A and 18B in a widthwise direction perpendicular to the direction of extension of the mounting portion 18 is the sectional center M1 of the mounting portion 18. The sectional center M1 contains a point bisecting the width of the mounting portion 18 into dimensions L3 as shown by point P in FIG. 4.

Similarly, the sectional center M2 is defined as the locus of the sectional center in terms of the strength of materials with respect to a cross-section perpendicular to the direction of extension of the mounting portion 19. In this embodiment, for example, the locus of a point bisecting the distance between the inner and outer peripheral surfaces 19A and 19B in a widthwise direction perpendicular to the direction of extension of the mounting portion 19 is the sectional center M2 of the mounting portion 19. As shown in FIG. 2, the mounting portions 18 and 19 are curved in the axial direction in an approximately L or S shape so that the proximal end of each of the mounting portions 18 and 19 is closer to the disk 1 than the distal end thereof.

More specifically, the proximal end of each of the mounting portions 18 and 19 is disposed at position S (FIG. 3) on the bridge connecting portion 15B2, which connects the bridge portion 15A and the cylinder bore circumferential wall portion 15B1 of the cylinder portion 15B that forms the cylinder bore 16. The position S is adjacent to the outermost and neighboring portions of the bridge connecting portion 15B2 in the radial direction of the disk 1. Moreover, the position S is closer to the disk pass portion 17 with respect to the axial direction of the disk 1 and outside the outer periphery of the disk 1 with respect to the radial direction of the disk 1. Thus, the mounting portions 18 and 19 are arranged to suppress the tilting of the sliding pins 20 and 21 with respect to the pin-fitting holes 12A of the arm portions 12 during a braking operation.

As shown in FIG. 2, the pair of sliding pins 20 and 21 are provided on the caliper 14. The proximal ends of the sliding pins 20 and 21 are secured to the distal ends of the mounting portions 18 and 19 through pin bolts 22 fitted in the pin bolt holes 18C and 19C, respectively. The distal end portions of the sliding pins 20 and 21 are slidably fitted in the respective pin-fitting holes 12A of the arm portions 12. Thus, the caliper 14 is slidably supported by the mounting member 11 through the sliding pins 20 and 21.

When the brake is not activated, the sliding pins 20 and 21 are fitted in the respective pin-fitting holes 12A of the arm portions 12 to a depth L1 (i.e. the fitting length L1). In this state, the sliding pins 20 and 21 and the respective arm portions 12 are in contact with each other over the range of the fitting length L1 from the open end of each pin-fitting hole 12A to the distal end of each of the sliding pins 20 and 21.

When the disk brake is mounted on a vehicle, the sliding pin 21 lies above the other sliding pin 20 and is used as a main pin for supporting the caliper 14. Therefore, the distal end portion of the sliding pin 21 has a larger diameter than that of the sliding pin 20, which is a sub-pin. Accordingly, a slight clearance formed between the distal end of the main sliding pin 21 and the pin-fitting hole 12A is smaller than the clearance between the distal end of the sub-sliding pin 20 and the pin-fitting hole 12A.

The piston 23 is a roofed cylindrical piston, which is slidably fitted in the cylinder bore 16 of the caliper 14. As shown in FIG. 3, the piston 23 is slidably displaced in the axial direction by the pressure of a brake fluid supplied into the cylinder bore 16, causing the friction pads 24 to be pressed against both sides of the disk 1 in cooperation with the claw portion 15C.

The friction pads 24 are disposed at both sides of the disk 1, i.e. one (inner) side and the other (outer) side of the disk 1. As shown in FIGS. 1 and 3, each of the friction pads 24 includes a lining 25 and a backing plate 26. The lining 25 comes in frictional contact with the disk 1 when the brake is activated. The backing plate 26 is overlaid on the back of the lining 25 and rigidly secured thereto. The backing plate 26 has lug portions 26A (only one of which is illustrated) projecting from both longitudinal ends of the backing plate 26.

The lug portions 26A are slidably fitted in the pad guide portions 12A of the mounting member 11 through pad springs 28 (described later). Thus, the friction pads 24 are slidably supported by the respective arm portions 12 of the mounting member 11 through the respective lug portions 26A. When the brake is activated, the friction pads 24 are pressed against both sides of the disk 1 by the caliper 14 (piston 23) to apply braking force to the disk 1.

A wear alarm member 27 is provided on the lug portion 26A of each friction pad 24. As shown in FIGS. 1 and 2, each wear alarm member 27 extends from the reverse side of the backing plate 26 in an approximately U shape such that the distal end of the wear alarm member 27 faces the disk 1 across a predetermined gap. When the lining 25 of the associated friction pad 24 has worn away to a predetermined position, the distal end of the wear alarm member 27 comes in sliding contact with the disk 1 and generates an extraordinary sound, thereby detecting the wear of the friction pad 24 and giving an alarm to inform the driver that the friction pad 24 needs replacement.

A pair of pad springs 28 are provided in the pad guide portions 12B of each arm portion 12. As shown in FIG. 1, the pad springs 28, together with the pad guide portions 12B, slidably guide the friction pads 24 in the axial direction of the disk 1 through the lug portions 26A of the backing plates 26. As shown in FIG. 2, the pad springs 28 disposed on the entrance side with respect to the rotational direction A of the disk 1 are integrally provided with a pair of return spring portions 28A. Each return spring portion 28A is elastically engaged with the inner periphery of the wear alarm member 27, which is bent in an approximately U shape, to urge the associated friction pad 24 away from the disk 1 at all times through the wear alarm member 27.

Reference numeral 29 denotes a supply and discharge opening for supplying and discharging a brake fluid into and from the cylinder bore 16. As shown in FIGS. 3 and 4, the supply and discharge opening 29 is formed in the cylinder portion 15B of the caliper body 15 at the bottom of the cylinder bore 16. The supply and discharge opening 29 is positioned on the center line O2—O2 between the pin bolt holes 18C and 19C.

The disk brake according to this embodiment is arranged as stated above. The disk brake operates as follows.

When the brake is not activated, as shown in FIGS. 2 and 3, each friction pad 24 is held so as to face one side of the disk 1 across a slight gap. The disk 1 is rotating together with the wheel. At this time, the caliper 14 is supported in a stable balanced condition by the mounting member 11 through the sliding pins 20 and 21 and the arm portions 12 because the center of gravity G of the caliper 14 is placed within the range defined by the fitting length L1 of the sliding pins 20 and 21 relative to the arm portions 12 (pin-fitting holes 12A) in the axial direction of the disk 1.

Accordingly, there is no likelihood that the end surface of the piston 23 and the claws 15C1 and 15C2 of the claw portion 15C may tilt with respect to the two sides of the disk 1. Thus, a slight gap is ensured between each friction pad 24 and the disk 1 when the brake is not activated.

When the brake is activated, a brake fluid is externally supplied into the cylinder bore 16 of the caliper 14, and the pressure of the brake fluid causes the piston 23 to be slidably displaced toward the disk 1. Consequently, the inner friction pad 24 is pressed against the disk 1 by the piston 23. At this time, the caliper 14 is subjected to reaction force from the disk 1 and displaced toward the inner side relative to the mounting member 11 through the sliding pins 20 and 21. At the same time, the caliper 14 presses the outer friction pad 24 against the disk 1 through the claws 15C1 and 15C2 of the claw portion 15C. Thus, the disk 1 is given braking force from both sides by the friction pads 24.

At this time, braking torque is transmitting from the disk to the caliper 14 through the friction pads 24, and this braking torque acts on the caliper 14 as bending moment that urges the outer side of the caliper 14 to be displaced toward the rotational direction A. Accordingly, there is a tendency that on the cylinder portion 15B side, the surface pressure of the friction pad 24 applied to the disk 1 is higher at the entrance side in the rotational direction A than at the exit side, whereas on the claw portion 15C side, the surface pressure of the friction pad 24 applied to the disk 1 is higher at the exit side than at the entrance side.

In this embodiment, the cylinder portion 15B is decentered toward the exit side in the rotational direction A, and the entrance-side claw 15C1 is formed with a greater width than the exit-side claw 15C2. Therefore, the surface pressure of each friction pad 24 is adjusted so as to be uniform in the rotational direction A on both sides of the disk 1.

Incidentally, at this time, the cylinder portion 15B and claw portion 15C of the caliper 14 are subjected to reaction force that urges the cylinder portion 15B and the claw portion 15C to move away from the disk 1. As a result, the portions of the cylinder portion 15B and the claw portion 15C closer to the inner periphery of the disk 1 are slightly deformed so as to diverge from each other. Consequently, the sliding pins 20 and 21 tend to tilt when sliding in the pin-fitting holes 12A of the arm portions 12.

Accordingly, we performed structural analyses in designing to find a portion of the caliper body 15 that suffers minimal deformation during a braking operation. As a result, we found that, as shown by the imaginary line in FIGS. 3 and 10, where the deformation is the smallest is the bridge connecting portion 15B2, which is the border between the bridge portion 15A and the cylinder portion 15B. To be more precise, it is a position S in the bridge connecting portion 15B2 that is closer to the disk pass portion 17 with respect to the axial direction of the disk 1 and outside the outer periphery of the disk 1 with respect to the radial direction of the disk 1.

Accordingly, if the disk brake has a structure in which each of the mounting portions 18 and 19 is provided at the position S, it is possible to suppress the tilting of the mounting portions 18 and 19 with respect to the axial direction during a braking operation because the position S gives a minimal deformation of the caliper body 15 due to reaction force resulting from the application of the friction pad pressure.

Therefore, in this embodiment, the mounting portions 18 and 19 are provided such that the sectional centers M1 and M2 of the mounting portions 18 and 19 lie outside the disk pass portion 17, that is, outside the outer periphery of the disk 1, in the radial direction of the disk 1. Moreover, the proximal ends of the mounting portions 18 and 19 are integrally formed with the bridge connecting portion 15B2, which is the border between the bridge portion 15A and the cylinder portion 15B. Furthermore, the mounting portion 18 and 19 are curved relative to the axial direction of the disk 1 so that the proximal ends of the mounting portions 18 and 19 are closer to the disk 1 than the distal ends thereof. The proximal ends of the mounting portions 18 and 19 are disposed on the bridge connecting portion 15B2 at respective positions closer to the disk pass portion 17 with respect to the axial direction of the disk 1.

Thus, the proximal end of each of the mounting portions 18 and 19 can be provided on the caliper body 15 at the position S in the bridge connecting portion 15B2, which is the border between the bridge portion 15A and the cylinder portion 15B. Consequently, when the caliper 14 is subjected to the reaction force resulting from the application of the friction pad pressure during a braking operation, the sliding pins 20 and 21 can be surely prevented from tilting together with the cylinder portion 15B of the caliper 14. Moreover, the resistance to sliding of the sliding pins 20 and 21 can be kept favorably low at all times with respect to the pin-fitting holes 12A of the mounting member 11. Furthermore, it become unnecessary to increase the wall thickness of the bridge portion 15A of the caliper body 15, for example, to improve the rigidity in order to obtain advantageous effects equal to those stated above. Accordingly, it is possible to achieve a reduction in the weight of the disk brake.

Therefore, according to this embodiment, the caliper 14 can slide smoothly relative to the mounting member 11 during a braking operation even if the cylinder portion 15B (piston 23) and claw portion 15C of the caliper 14 follow oscillation, tilting, etc. of the disk 1. Accordingly, the friction pads 24 can be stably pressed against the disk 1 by the caliper 14. Thus, it is possible to surely prevent variation in the pressing force applied to the friction pads 24 from the caliper 14 during the braking operation, and braking torque variations, which cause brake judder, can be reduced to a considerable extent.

Furthermore, by improving the follow-up performance of the caliper 14, which presses the friction pads 24 against both sides of the disk 1, it is possible to prevent the friction pad 24 closer to the cylinder portion 15B, which is pressed directly by the piston 23, from wearing at a higher rate than the friction pad 24 closer to the claw portion 15C. Accordingly, the brake performance can be surely improved without increasing the number of parts in comparison to the prior art.

Moreover, the cylinder portion 15B is decentered toward the exit side in the rotational direction A, and the entrance-side claw 15C1 is formed with a greater width than the exit-side claw 15C2. Therefore, the surface pressure of each friction pad 24 can be appropriately adjusted so as to be uniform in the rotational direction A of the disk 1. Accordingly, the friction pads 24 can be surely prevented from wearing non-uniformly. Moreover, it is possible to prevent the driver's brake pedal feeling from lowering owing to non-uniform wear of the friction pads 24.

Meanwhile, the center of gravity G of the caliper 14 is placed within the range of the fitting length L1 of the sliding pins 20 and 21 relative to the arm portions 12 in the axial direction of the disk 1. Therefore, when the brake is not activated, the whole caliper 14 can be kept supported in a stable balanced condition by the mounting member 11 through the sliding pins 20 and 21 and the arm portions 12. Accordingly, it is possible to surely prevent the caliper 14 from tilting by gravity or the like and causing the friction pads 24 to touch the disk 1 undesirably when the brake is not activated. Thus, it is possible to prevent non-uniform wear of the disk 1, which would otherwise cause brake judder, and also possible to increase the lifetime of the friction pads 24 and to enhance the fuel economy of the vehicle.

Furthermore, the mounting portions 18 and 19 are curved toward the claw portion 15C so that the proximal ends of the mounting portions 18 and 19 are closer to the disk 1 than the distal ends thereof. This enables the fitting positions of the sliding pins 20 and 21 relative to the arm portions 12 to be readily adjusted so that the center of gravity G of the caliper 14, in which the cylinder portion 15B is likely to be heavier than the claw portion 15C, is placed within the range of the fitting length L1.

Moreover, the sliding pin 21, which has a larger diameter to serve as a main sliding pin, is disposed above the sliding pin 20, and the friction pads 24 are urged away from the disk 1 by the return spring portions 28A of the pad springs 28 at all times. Therefore, when the brake is not activated, rattling of the caliper 14 can be stably suppressed from above by the sliding pin 21 and the arm portion 12 in which the sliding pin 21 is fitted with a slight clearance. Moreover, the urging force from the return spring portions 28A surely prevents the friction pads 24 from being dragged by the disk 1 through undesired contact therewith. It is also possible to prevent nonuniform wear of the disk 1.

In addition, the center of gravity G of the caliper 14 is offset toward the claw portion 15C by the distance ΔL from the extremity of the fitting length L1 on the cylinder portion 15B side. Therefore, when the brake is not activated, the center of gravity G of the caliper 14 can be kept within the range of the fitting length L1 at all times even when the center of gravity G gradually shifts toward the cylinder portion 15B as each friction pad 24 wears away within the normal serviceable range (within the effective wear margin). Thus, the balanced condition of the caliper 14 can be maintained stably.

Meanwhile, the mounting member 11 is provided with a thick-walled portion 13B at the exit side in the rotational direction A, which has a greater wall thickness than the entrance-side portion 13C. Accordingly, the rigidity of the mounting member 11 can be reliably improved by the thick-walled portion 13B, which bears braking torque from the disk 1 that is transmitted through the friction pads 24. Moreover, the overall weight of the mounting member 11 can be reduced.

Figure 6:
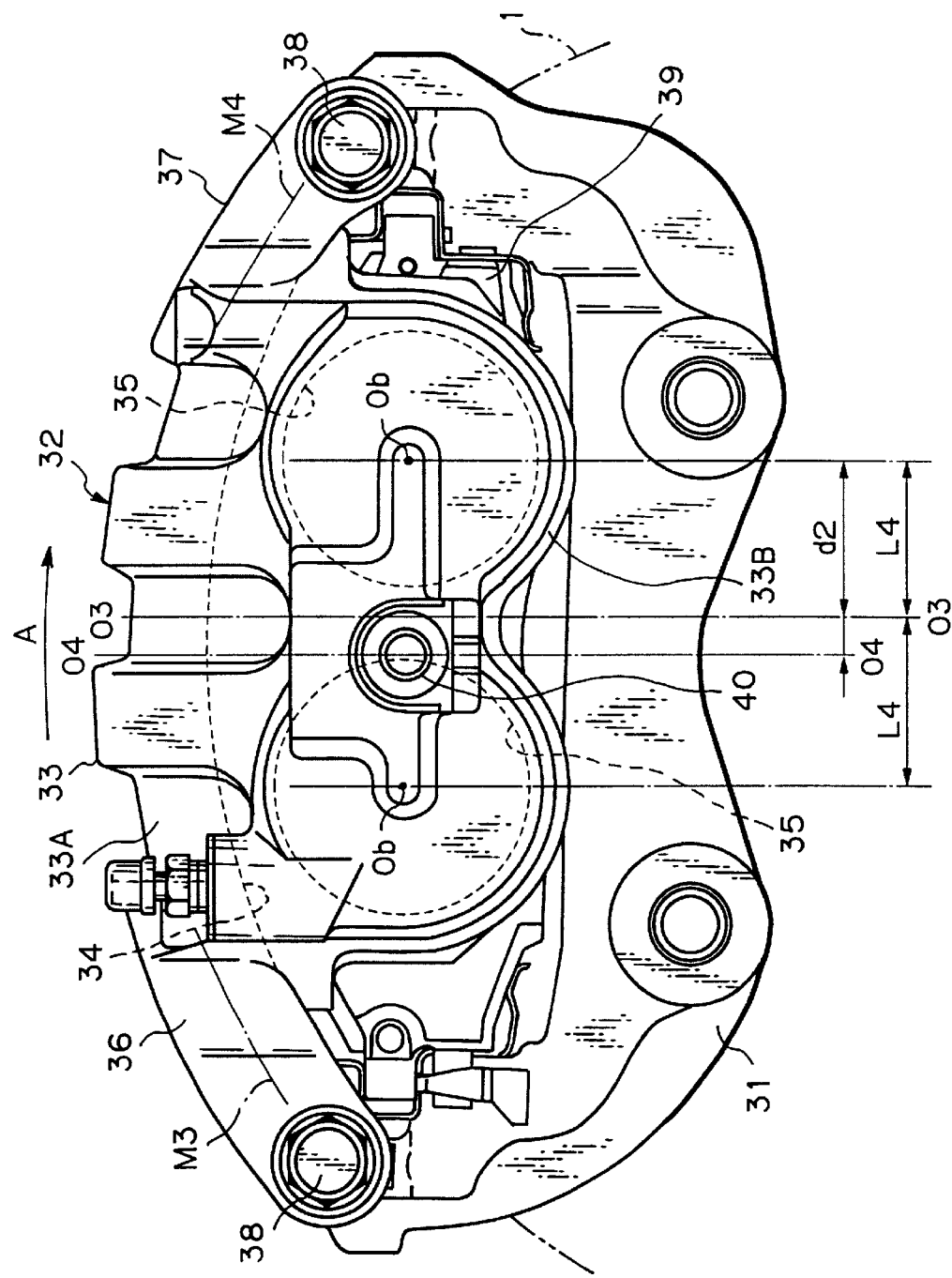
FIG. 6 is a front view showing a disk brake according to a second embodiment of the present invention.

FIG. 6 shows a second embodiment of the present invention. The feature of this embodiment resides in that the present invention is applied to a twin bore-type disk brake in which two pistons are provided in a caliper, for example. It should be noted that in this embodiment the same constituent elements as those in the first embodiment are denoted by the same reference characters, and a description thereof is omitted.

The disk brake according to this embodiment has a mounting member 31 and a caliper 32 slidably supported by the mounting member 31. The caliper 32 includes a caliper body 33 and a pair of mounting portions 36 and 37 (described later) in substantially the same way as in the first embodiment. The caliper body 33 has a bridge portion 33A, a cylinder portion 33B, and a claw portion (not shown). The caliper body 33 is provided with a disk pass portion 34. In this embodiment, however, the cylinder portion 33B is provided with two cylinder bores 35. Each cylinder bore 35 is slidably fitted with a piston (not shown).

The pair of mounting portions 36 and 37, which are provided on the caliper body 33, are arranged in substantially the same way as in the first embodiment. That is, the mounting portions 36 and 37 project from a bridge connecting portion 33B2 of the caliper body 33 toward the entrance and exit sides, respectively, with respect to the rotational direction A of the disk 1. The mounting portions 36 and 37 have respective sliding pins (not shown) secured to their distal ends through respective pin bolts 38.

The center line O3—O3 of the cylinder portion 33B bisects the distance between the respective centers Ob of the cylinder bores 35 into dimensions L4. The center line O3—O3 is displaced toward the exit side in the rotational direction A by a distance d2 relative to the center line O4—O4 between the sliding pins.

The mounting portions 36 and 37 extend in the circumferential direction of the disk 1 with a predetermined curvature. The mounting portions 36 and 37 are arranged such that the sectional centers M3 and M4 thereof lie outside the disk pass portion 34, that is, outside the outer periphery of the disk 1, in the radial direction of the disk 1. The mounting portions 36 and 37 are curved in the axial direction so that the proximal ends thereof are closer to the disk 1 than the distal ends thereof. When the brake is activated, the friction pads 39 are pressed against both sides of the disk 1 by the caliper 32 (the pistons).

Reference numeral 40 denotes a supply and discharge opening for supplying and discharging a brake fluid into and from the cylinder bores 35. The supply and discharge opening 40 is formed in the cylinder portion 33B of the caliper body 33 at the bottom side of the cylinder bores 35. The supply and discharge opening 40 is positioned on the center line O4—O4 between the sliding pins.

The disk brake according to this embodiment is arranged as stated above. The disk brake provides advantageous effects substantially similar to those in the first embodiment.

Although in the foregoing embodiments the center line of the cylinder portion of the caliper is displaced toward the exit side in the rotational direction of the disk by a predetermined distance relative to the center line between the sliding pins, the two center lines may be made coincident with each other. In the first embodiment the entrance-side claw, which is located on the entrance side in the rotational direction of the disk, is formed with a greater width than the exit-side claw. However, the entrance- and exit-side claws may be formed with the same size.

In the foregoing embodiments, the sliding pins 20 and 21 provided on the mounting portions 18 and 19 (36 and 37) of the caliper 14 (32) are slidably fitted in the pin-fitting holes 12A provided in the arm portions 12 of the mounting member 11 (31). However, the present invention is not necessarily limited to the described arrangement. The arrangement may be such that mounting portions having guide holes are provided on the caliper, and sliding pins provided on the mounting member are slidably fitted into the guide holes.

Although in the foregoing embodiments the disk brake is applied to vehicles, for example, automobiles, the present invention is not necessarily limited thereto. For example, the present invention may also be applied to brake systems other than those used in vehicles.

As has been detailed above, according to the present invention, the caliper has a caliper body that has a bridge portion, a cylinder portion and a claw portion. The caliper further has mounting portions. Each mounting portion is disposed such that at least the sectional center thereof lies outside the outer periphery of the disk. Therefore, even when the caliper is deformed by reaction force from the disk during a braking operation, the sliding pins can be surely prevented from tilting together with the cylinder portion. Accordingly, the resistance to sliding of the sliding pins relative to the guide holes can be kept favorably low at all times. Moreover, it becomes unnecessary to increase the wall thickness of the caliper body, for example. Accordingly, during a braking operation, the caliper can slide smoothly while following oscillation, tilting, etc. of the disk. Thus, the friction pads can be stably pressed against the disk by the caliper. Moreover, it is possible to surely prevent variation in the pressing force applied to the friction pads from the caliper, and braking torque variations, which cause brake judder, can be reduced to a considerable extent. Furthermore, it is possible to prevent the cylinder portion-side friction pad from wearing at a higher rate than the claw portion-side friction pad. Accordingly, the brake performance can be surely improved without increasing the number of parts in comparison to the prior art.

In a case where each mounting portion is disposed such that the proximal end thereof is closer to the disk than the distal end thereof where a sliding pin is mounted, it is possible to surely prevent the sliding pins from tilting together with the cylinder portion during a braking operation, and the caliper can slide smoothly while following oscillation, tilting, etc. of the disk. In addition, the fitting position of each sliding pin relative to the guide hole can be adjusted so that the center of gravity of the caliper is placed at an appropriate position in the axial direction of the disk. Thus, it is possible to surely improve the balanced condition of the caliper when the brake is not activated.

In a case where the center of gravity of the caliper when the brake is not activated is placed within the range of a fitting length of each sliding pin relative to the guide hole in the axial direction of the disk, the whole caliper can be kept supported in a stable balanced condition by the mounting member through the fitting portions of the sliding pins in the guide holes even when the brake is not activated. Accordingly, it is possible to surely prevent the caliper from tilting by gravity, which would otherwise cause dragging of the friction pad, and also possible to increase the lifetime of the friction pads and to enhance the fuel economy of the vehicle.

What is claimed is:

1. A disc brake, comprising:
    a rotatable disc having an axis, an outer periphery, and first and second sides;
    a first friction member on said first side;
    a second friction member on said second side;
    a mounting member adapted to be secured to a non-rotating part of a vehicle;
    a caliper including
      (i) a caliper body having a cylinder portion disposed on said first side and provided with a cylinder bore, a claw portion disposed on said second side, and a bridge portion extending over said outer periphery of said disc and interconnecting said cylinder portion to said claw portion; and
      (ii) first and second mounting portions each having a proximal end provided substantially adjacent said cylinder portion and a distal end spaced from said caliper body, wherein said first and second mounting portions extend oppositely from said caliper body with respect to an axial plane of said disc from said proximal ends to said distal ends, respectively, such that sections including said proximal and distal ends of each of said first and second mounting portions, respectively, lie outside of said outer periphery of said disc;
    first and second sliding pins provided on one of said mounting member and said first and second mounting portions, respectively;
    first and second guide holes provided in the other of said mounting member and said first and second mounting portions, respectively, wherein said sliding pins are receivable within said guide holes, respectively, such that said caliper is slidably supportable by said mounting member; and
    a piston provided in said cylinder portion, wherein said piston is operable to press said first friction member against said first side of said disc, whereby said caliper slides relative to said mounting member via said sliding pins and guide holes such that said claw portion presses said second friction member against said second side of said disc,
    wherein each of said first and second mounting portions has opposite side surfaces facing to and away from said disc, respectively, with each of said first and second mounting portions being disposed such that both said opposite side surfaces of said proximal ends, respectively, are respectively axially closer to said disc than are both said opposite side surfaces of said distal ends, respectively.

2. The disc brake according to claim 1, wherein said sliding pins are receivable within said guide holes at said distal ends of said first and second mounting portions, respectively.

3. The disc brake according to claim 2, wherein said sections each include a sectional center of said first and second mounting portions, respectively.

4. The disc brake according to claim 3, wherein said sliding pins are receivable within said guide holes for an axial fitting length of said guide holes, respectively, and wherein said caliper has a center of gravity that is located along said axial fitting length at least when said disc brake is not activated.

5. The disc brake according to claim 3, wherein said sliding pins are separated from one another by a distance, and said cylinder bore has a central axis which is offset relative to a line bisecting said distance in the direction of rotation of said disc.

6. The disc brake according to claim 5, wherein said claw portion includes an entrance-side claw and an exit-side claw spaced from one another in the direction of rotation of said disc, with said entrance-side claw having a greater width than a width of said exit-side claw.

7. The disc brake according to claim 3, wherein said claw portion includes an entrance-side claw and an exit-side claw spaced from one another in the direction of rotation of said disc, with said entrance-side claw having a greater width than a width of said exit-side claw.

8. The disc brake according to claim 2, wherein said sliding pins are receivable within said guide holes for an axial fitting length of said guide holes, respectively, and wherein said caliper has a center of gravity that is located along said axial fitting length at least when said disc brake is not activated.

9. The disc brake according to claim 2, wherein said sliding pins are separated from one another by a distance, and said cylinder bore has a central axis which is offset relative to a line bisecting said distance in the direction of rotation of said disc.

10. The disc brake according to claim 9, wherein said claw portion includes an entrance-side claw and an exit-side claw spaced from one another in the direction of rotation of said disc, with said entrance-side claw having a greater width than a width of said exit-side claw.

11. The disc brake according to claim 2, wherein said claw portion includes an entrance-side claw and an exit-side claw spaced from one another in the direction of rotation of said disc, with said entrance-side claw having a greater width than a width of said exit-side claw.

12. The disc brake according to claim 1, wherein said sliding pins are receivable within said guide holes for an axial fitting length of said guide holes, respectively, and wherein said caliper has a center of gravity that is located along said axial fitting length at least when said disc brake is not activated.

13. The disc brake according to claim 1, wherein said sliding pins are separated from one another by a distance, and said cylinder bore has a central axis which is offset relative to a line bisecting said distance in the direction of rotation of said disc.

14. The disc brake according to claim 13, wherein said claw portion includes an entrance-side claw and an exit-side claw spaced from one another in the direction of rotation of said disc, with said entrance-side claw having a greater width than a width of said exit-side claw.

15. A disc brake, comprising:
a rotatable disc having an axis, an outer periphery, and first and second sides;
a first friction member on said first side;
a second friction member on said second side;
a mounting member adapted to be secured to a non-rotating part of a vehicle;
a caliper including
  (i) a caliper body having a cylinder portion disposed on said first side and provided with a cylinder bore, a claw portion disposed on said second side, and a bridge portion extending over said outer periphery of said disc and interconnecting said cylinder portion to said claw portion; and
  (ii) first and second mounting portions each having a proximal end provided on said caliper body and a distal end spaced from said caliper body, wherein said first and second mounting portions extend oppositely from said caliper body with respect to an axial plane of said disc from said proximal ends to said distal ends, respectively, such that sections including said proximal and distal ends of each of said first and second mounting portions, respectively, lie outside of said outer periphery of said disc;
first and second sliding pins provided on one of said mounting member and said first and second mounting portions, respectively;
first and second guide holes provided in the other of said mounting member and said first and second mounting portions, respectively, wherein said sliding pins are receivable within said guide holes, respectively, such that said caliper is slidably supportable by said mounting member; and
a piston provided in said cylinder portion, wherein said piston is operable to press said first friction member against said first side of said disc, whereby said caliper slides relative to said mounting member via said sliding pins and guide holes such that said claw portion presses said second friction member against said second side of said disc,
wherein said sliding pins are separated from one another by a distance, and said cylinder bore has a central axis which is offset relative to a line bisecting said distance in the direction of rotation of said disc.

16. The disc brake according to claim 15, wherein said claw portion includes an entrance-side claw and an exit-side claw spaced from one another in the direction of rotation of said disc, with said entrance-side claw having a greater width than a width of said exit-side claw.

17. The disc brake according to claim 15, wherein said sliding pins are receivable within said guide holes at said distal ends of said first and second mounting portions, respectively.

18. The disc brake according to claim 17, wherein said claw portion includes an entrance-side claw and an exit-side claw spaced from one another in the direction of rotation of said disc, with said entrance-side claw having a greater width than a width of said exit-side claw.

19. The disc brake according to claim 17, wherein said sections each include a sectional center of said first and second mounting portions, respectively.

20. The disc brake according to claim 19, wherein said claw portion includes an entrance-side claw and an exit-side claw spaced from one another in the direction of rotation of said disc, with said entrance-side claw having a greater width than a width of said exit-side claw.

* * * * *